United States Patent [19]

Kern

[11] 4,395,248
[45] Jul. 26, 1983

[54] MULTI-SPEED TRANSMISSION

[75] Inventor: John M. Kern, Ithaca, N.Y.

[73] Assignee: Borg-Warner Corporation, Chicago, Ill.

[21] Appl. No.: 198,506

[22] Filed: Oct. 20, 1980

[51] Int. Cl.³ .................. F16H 55/56; F16H 55/30; F16H 11/04
[52] U.S. Cl. .................................. 474/24; 474/29; 474/152; 474/160
[58] Field of Search ............... 474/69, 77, 78, 80, 474/81, 24, 47, 49, 52, 53, 152, 158, 160, 164, 168; 74/421 R

[56] References Cited

U.S. PATENT DOCUMENTS

| 280,519 | 7/1883 | Rumley | 74/421 R |
| 1,629,564 | 5/1927 | White | 74/440 |
| 1,993,131 | 3/1935 | Borgna | 474/24 |
| 2,074,997 | 3/1937 | Faltermayer | 474/24 |
| 3,037,396 | 6/1962 | Martin | 74/440 |
| 3,707,883 | 1/1973 | Kamenick | 474/47 |
| 3,918,515 | 12/1975 | Shiing | 474/152 |

FOREIGN PATENT DOCUMENTS

| 473246 | 5/1914 | France | 74/440 |
| 518820 | 1/1921 | France | 74/440 |
| 928578 | 6/1963 | United Kingdom | 74/440 |

Primary Examiner—Lawrence J. Staab
Assistant Examiner—Andrew Joseph Rudy
Attorney, Agent, or Firm—Aubrey L. Burgess

[57] ABSTRACT

A multi-part sprocket and a multi-speed transmission comprising at least a pair of the sprockets, the sprockets each comprising an external toothed drive member surrounded by a two part externally toothed ring member, one part of which is axially movable with respect to the other with both parts having internal teeth meshing with the external teeth of the drive member. Another similar two part member surrounds the first; the similar member having external and internal teeth.

A chain connects a pair of sprockets, the chain meshing the external teeth. The speed ratio between the sprocket can be changed by axially moving parts of the ring member. The ring members have beveled surfaces facing one another to guide the chain during a speed ratio change.

7 Claims, 7 Drawing Figures

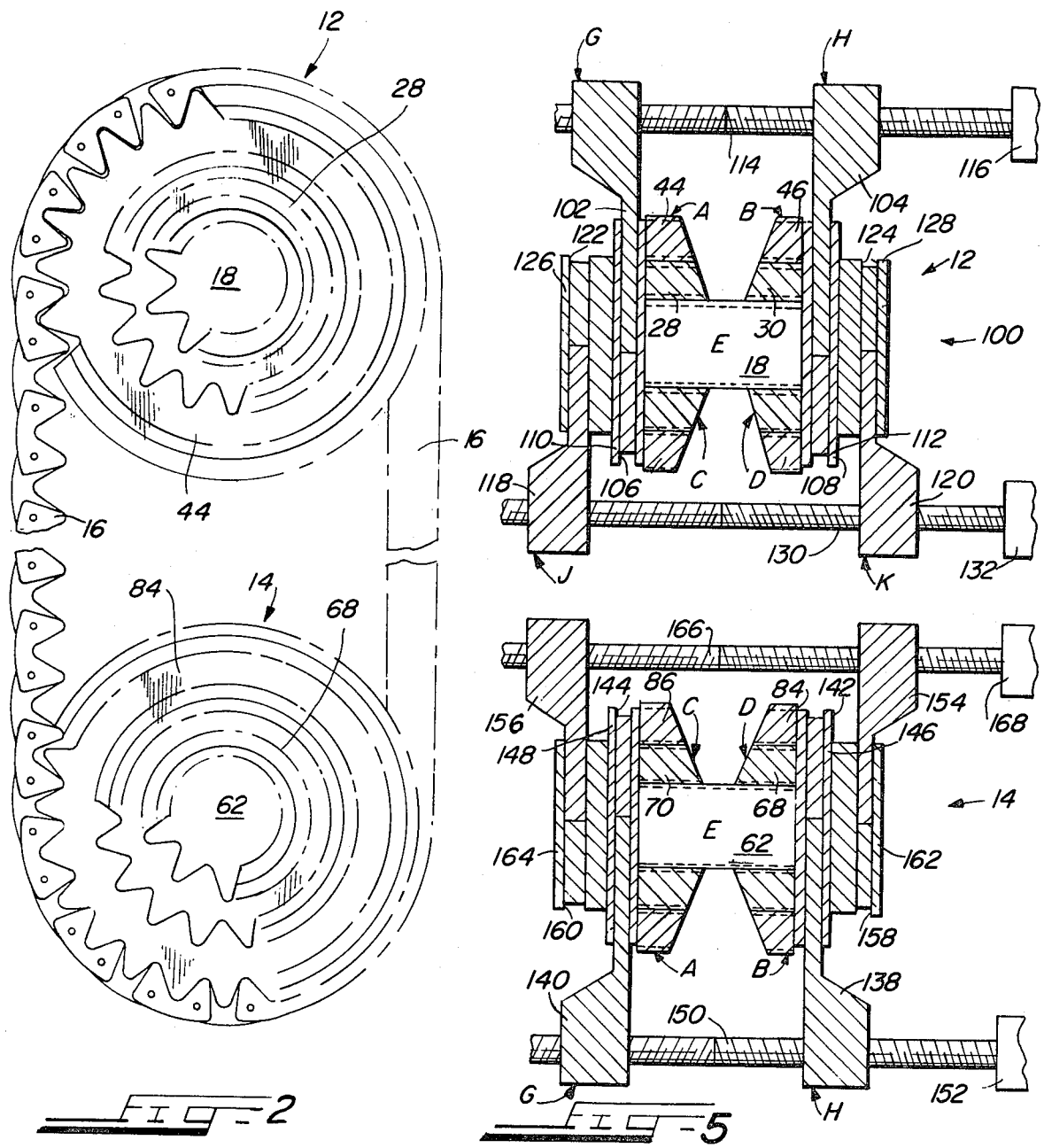
FIG-2
FIG-5
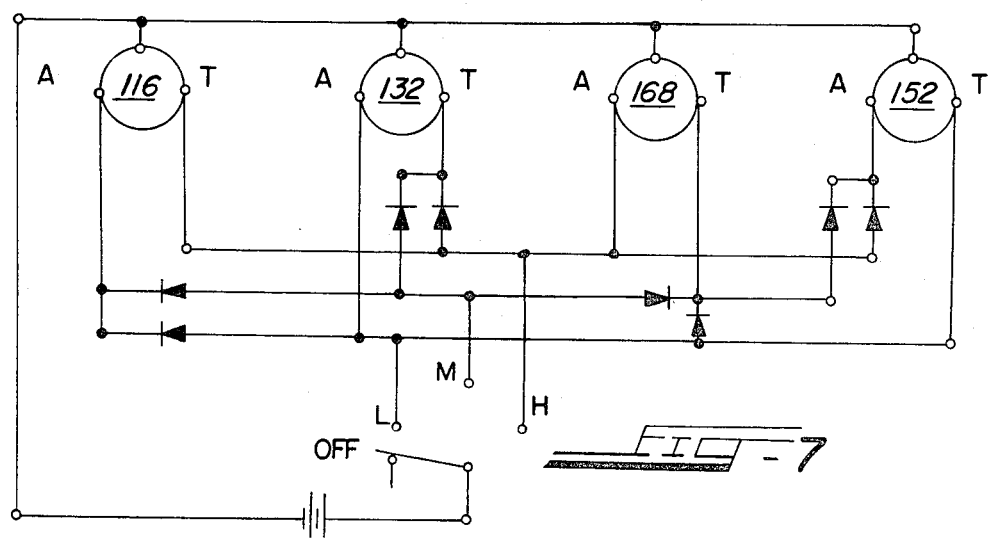
FIG-7

MULTI-SPEED TRANSMISSION

BACKGROUND OF THE INVENTION

Variable pulley transmissions are known in the art. One usual variable pulley transmission uses a pair of pulleys drivingly connected by an elastomeric belt. Such transmissions are for small horsepower uses; they would not be suitable for use in automotive applications. A more recent approach for automotive uses employs a composite metal belt for drivingly connecting the pulleys. One form of a metal belt comprises a plurality of relatively thin metal bands carrying a plurality of metal blocks, the blocks have tapered edge surfaces which contact the faces of the pulley flanges. One advantage of the variable pulley transmission is to provide stepless drive ratios within certain limits.

THE INVENTION

According to the invention herein described, a stepped transmission uses the positive drive capabilities of a power transmission chain to provide a change speed device. Silent chains are suitable for such a transmission, and offer availability, torque, speed and power handling capabilities and are reasonably priced in the market place.

In order to provide for the speed change requirements of a transmission, the pulleys of this invention are constructed of multiple parts, for example, an externally toothed gear or hub connected to a drive or driven shaft, a two part ring member, at least one part of which is axially movable with respect to the other and at least a second two part member of similar construction. Each of the two part members has internal and external teeth, the internal teeth of the first meshing with the teeth of the gear or hub and the external teeth of the first meshing with the internal teeth of the second; thus a positive drive is provided between the component parts of each sprocket. The chain meshes with the external teeth on the gear and the external teeth on the first and second two part members in other drive ratios. Given the three major components, as described, a three speed positive drive transmission is provided. Each of the two part members comprises a ring with a beveled face, the face of one being opposite to that of the other. The beveled faces provide guide surfaces for the chain during speed ratio changes. Additional two part members can provide additional speed ratios, as will be understood.

Various means can be used to control or vary the speed; these can be by manual or automatic mechanical, hydraulic or pneumatic operation.

THE DRAWINGS

FIG. 2 is a partial side view of the transmission of FIG. 1;

FIGS. 3 and 4 are views similar to FIG. 1 showing other drive ratios;

FIG. 5 is a partial sectional view illustrating a control system for the transmission of FIG. 1;

FIG. 7 is a schematic of a typical control circuit.

DETAILED DESCRIPTION

Figure 1:
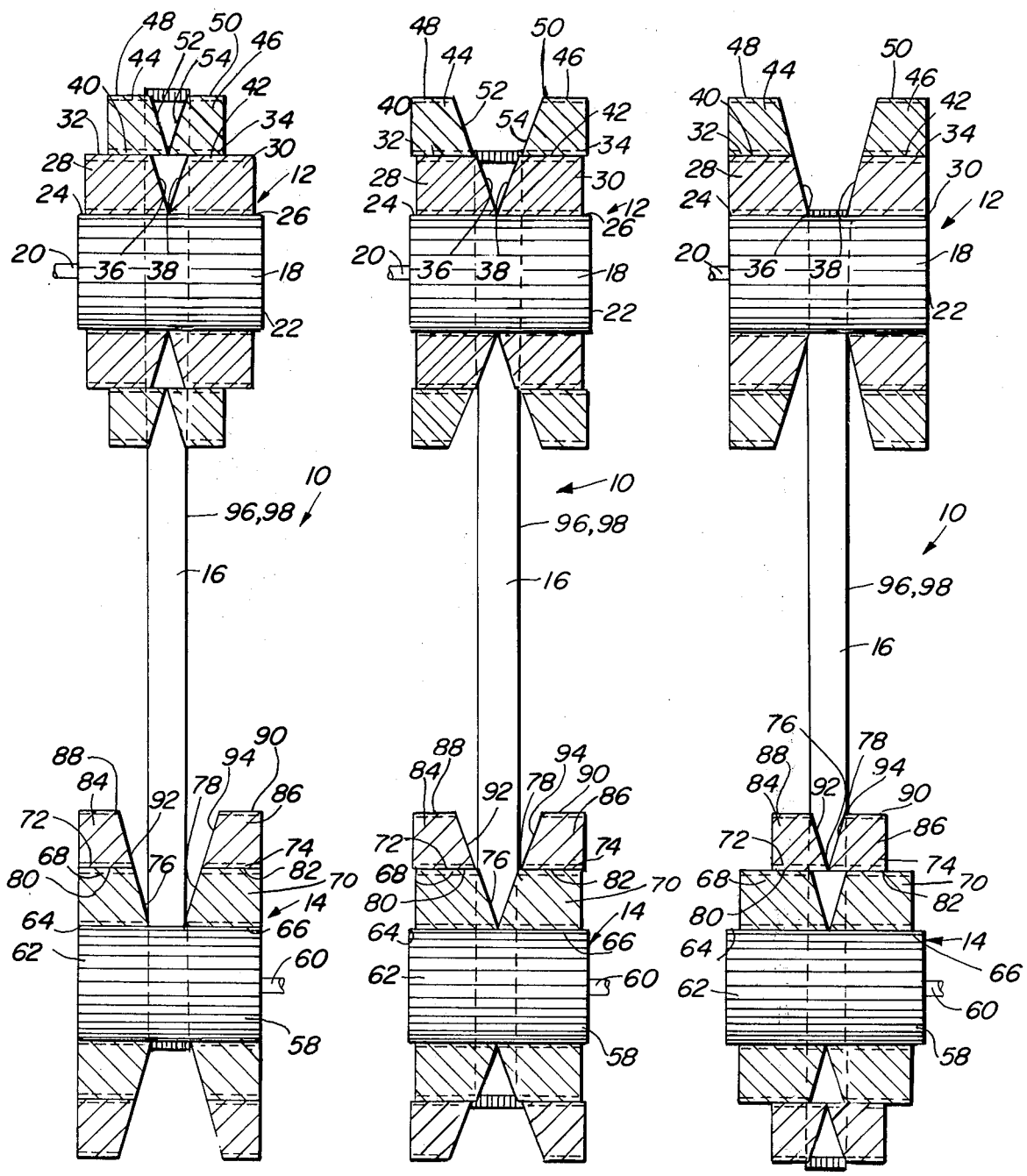
FIG. 1 is a sectional view of a transmission according to this invention in one drive ratio.

FIGS. 1 and 2 illustrate the basic features of the invention and show a transmission 10 comprising a driving sprocket assembly 12 and a driven sprocket assembly 14 drivingly connected by a chain 16. The driving sprocket assembly 12 comprises a center gear 18 connected to a drive shaft 20, the gear having external teeth 22. Meshing with the teeth 22 are internal teeth 24, 26 of ring members 28, 30 having external teeth 32, 34. Preferably both ring members 28, 30 are axially movable. The ring members 28, 30 are provided with angled surfaces 36, 38 facing one another. Meshing with the external teeth 32, 34 are internal teeth 40, 42 of ring members 44, 46 having external teeth 48, 50. Preferably both ring members 44, 46 are axially movable. The ring members 44, 46 are provided with angled surfaces 52, 54 facing one another. As illustrated in FIG. 1, for the particular drive ratio, the chain 16 meshes with the external teeth 48, 50.

The driven sprocket assembly 14 comprises a center gear 58 connected to a driven shaft 60, the gear having external teeth 62. Meshing with the teeth 62 are internal teeth 64, 66 of ring members 68, 70 having external teeth 72, 74. Preferably both ring members 68, 70 are axially movable. The ring members 68, 70 are provided with angled surfaces 76, 78 facing one another. Meshing with the external teeth 72, 74 are internal teeth 80, 82 of ring members 84, 86 having external teeth 88, 90. Preferably both ring members 84, 86 are axially movable. The ring members 84, 86 are provided with angled surfaces 92, 94 facing one another. The chain in the drive ratio of FIG. 1 meshes with the teeth 62 of the gear 58. The chain 16 comprises interleaved sets or ranks of links 96, preferably of the silent chain variety, joined by pivot means 98 which can be round pins or two part pins and rocker members, both well known in the art.

The drive ratio provided by the transmission illustrated in FIG. 1 is the high speed ratio. In the mid speed ratio, the drive and driven elements are the ring members 28, 30 and 68, 70, respectively. In the low speed ratio, the drive and driven elements are the center gear 18 and the ring members 84, 86, respectively.

The drive and driven assemblies can be also described as constructed of multiple sprockets, one of which in each assembly as the central gear while the others are of multiple parts.

Figure 6:
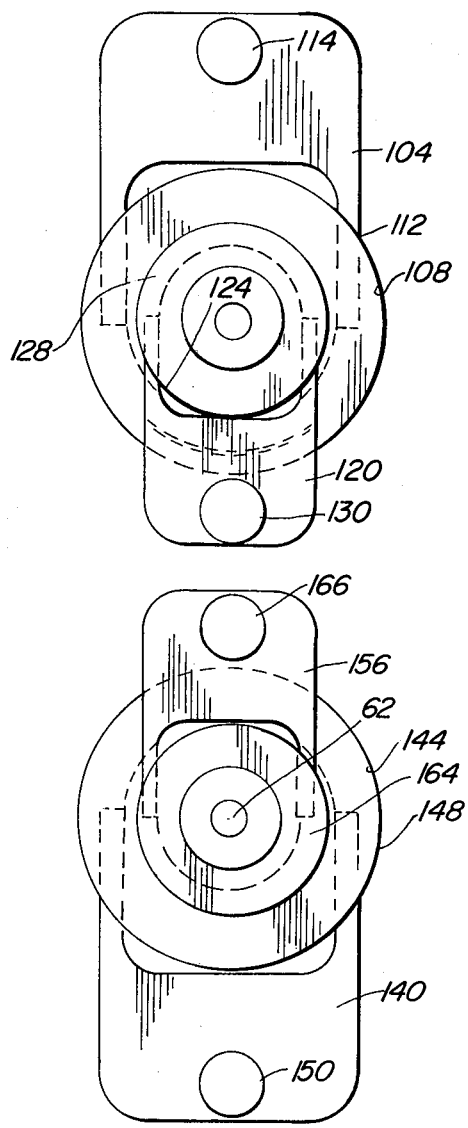
FIG. 6 is a side view of a portion of the control system of FIG. 5.

FIGS. 5 and 6 illustrate in part a typical control mechanism 100 for the transmission 10. The mechanism 100 for the drive assembly 12 comprises a pair of yokes or forks 102, 104 engaging slots 106, 108, respectively, in ring elements 110, 112 connected to ring members 44, 46, the forks being connected by a threaded screw 114 having left and right hand threads and rotated by a reversible motor 116. As will be readily understood, by energizing the motor 116, the forks 102 and 104 are axially moved, the direction depending upon the energization of the motor 116.

The mechanism 100 further comprises a pair of yokes or forks 118, 120 engaging slots 122, 124, respectively, in ring elements 126, 128 connected to ring members 28, 30, the forks being connected by a threaded screw 130 having left and right hand threads and rotated by a reversible motor 132. Energizing the motor 132 will cause axial movement of the ring members 28, 30.

The mechanism 100 for the driven assembly 14 is essentially the same as that for the drive assembly 12. It comprises a pair of yokes or forks 138, 140 engaging slots 142, 144, respectively, in ring elements 146, 148 connected to ring members 84, 86, the forks being connected by a threaded screw 150 having left and right hand threads and rotated by a reversible motor 152. By energizing the motor 152, the members 84, 86 are axially moved.

The mechanism also comprises a pair of yokes or forks 154, 156 engaging slots 158, 160, respectively, in ring elements 162, 164 connected to ring members 68, 70, the forks being connected by a threaded screw 166 having left and right hand threads, and rotated by reversible motor 168. Energizing the motor 168 will cause axial movement of the forks 154, 156.

The operation of the transmission is summarized below:

| HIGH SPEED | MEDIUM SPEED | LOW SPEED |
|---|---|---|
| 28, 30 together | 28, 30 together | 28, 30 apart |
| 44, 46 together | 44, 46 apart | 44, 46 apart |
| 84, 86 apart | 84, 86 apart | 84, 86 together |
| 68, 70 apart | 68, 70 together | 68, 70 together |
| (chain meshing with teeth 48, 50 and 62) | (chain meshing with teeth 32, 34 and 72, 74) | (chain meshing with teeth 22 and 88, 90) |

A typical control circuit is illustrated in FIG. 7, the motors 116, 132, 168 and 152 being reversible; the relationship of the ring members are indicated by the use of the legends A and T meaning apart and together, respectively.

It is believed that the operation of the transmission is readily apparent when the summary above is considered together with FIG. 7. By switching between the speed indicia, the desired speed ratio can be selected. While this control circuit is electrical, it is to be understood that mechanical controls or hydraulic and/or pneumatic controls or combinations thereof with electrical control can be used without departing from the spirit of the invention.

I claim:

1. A multi-speed drive system comprising:
   a multiple part drive means;
   a multiple part driven means;
   means connecting said drive and driven means;
   one part of both said drive and driven means having external teeth;
   a second part of both said drive and driven means comprising a pair of axially movable members each having internal teeth meshing with said first-named external teeth;
   means for moving one of said pairs of axially movable members to change the speed ratio between said drive and driven means;
   said connecting means being a chain;
   the radially outermost part of said drive means having external teeth with which said chain meshes in one speed ratio; and
   the radially outermost part of said driven means having external teeth with which said chain meshes in another and different speed ratio.

2. A multi-speed drive system as in claim 1 in which said axially movable members have angled surfaces facing one another providing a guide for said connecting means when said moving means moves each of one said pairs of axially movable members.

3. A multi-speed drive system as recited in claim 1 in which parts of said drive means are concentric to one another.

4. A multi-part drive system as recited in claim 1 in which parts of said driven means are concentric to one another.

5. A three speed transmission comprising:
   a first drive sprocket having external teeth;
   a second drive sprocket comprising a pair of ring members axially movable with respect to and surrounding said first drive sprocket and each having internal and external teeth, the internal teeth meshing with external teeth of the first drive sprocket;
   a third drive sprocket comprising a pair of ring members axially movable with respect to and surrounding said second drive sprocket and each having internal and external teeth, the internal teeth meshing with external teeth of the second drive sprocket;
   each of said ring members of said second and third drive sprockets having generally radial angled surfaces facing one another;
   a first driven sprocket having external teeth;
   a second driven sprocket comprising a pair of ring members axially movable with respect to and surrounding said first driven sprocket and each having internal and external teeth, the internal teeth meshing with the external teeth of the first driven sprocket;
   a third driven sprocket comprising a pair of ring members axially movable with respect to each other and surrounding said second driven sprocket and each having internal and external teeth, the internal teeth meshing with the external teeth of the second driven sprocket;
   each of said ring members of said second and third driven sprockets having generally radially angled surfaces facing one another; and
   means comprising a chain meshing with external teeth of one of said drive sprockets and one of said driven sprockets providing a drive therebetween.

6. In a multi-speed transmission:
   a drive sprocket assembly comprising a first drive sprocket having external teeth; at least one additional drive sprocket comprising a pair of ring members axially movable with respect to and surrounding said first drive sprocket and having internal and external teeth, and at least one additional drive sprocket being rotatably connected to said first drive sprocket by meshing teeth;
   a driven sprocket assembly comprising a first driven sprocket having external teeth; at least one additional driven sprocket comprising a pair of ring members axially movable with respect to and surrounding said first driven sprocket and having internal and external teeth, said at least one additional driven sprocket being rotatably connected to said first driven sprocket by meshing teeth;
   chain means meshing with external teeth on said drive sprocket and external teeth on said driven sprocket; and
   means to vary the drive ratio between the drive and driven sprocket assemblies.

7. In a multi-speed transmission as recited in claim 6, said drive and driven sprocket ring members each have angled surfaces facing one another and axially movable relative to one other to vary the drive ratio between said drive and driven sprocket assemblies, said angled surfaces guiding said rotatably connecting means when the drive ratio is varied.

* * * * *